J. E. STAPLES.
BED-BOTTOM.
No. 183,078. Patented Oct. 10, 1876.
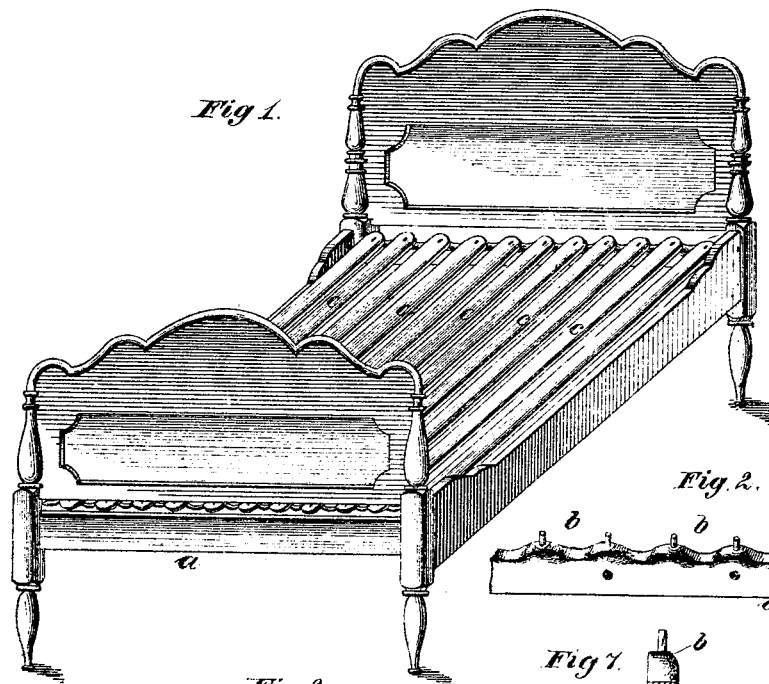
Fig. 1.
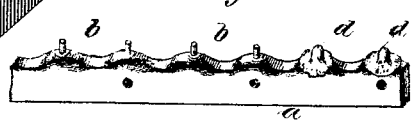
Fig. 2.
Fig. 7.
Fig. 3.
Fig. 4.
Fig. 5.
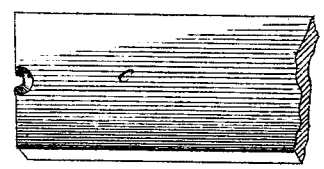
Fig. 8. Fig. 6.
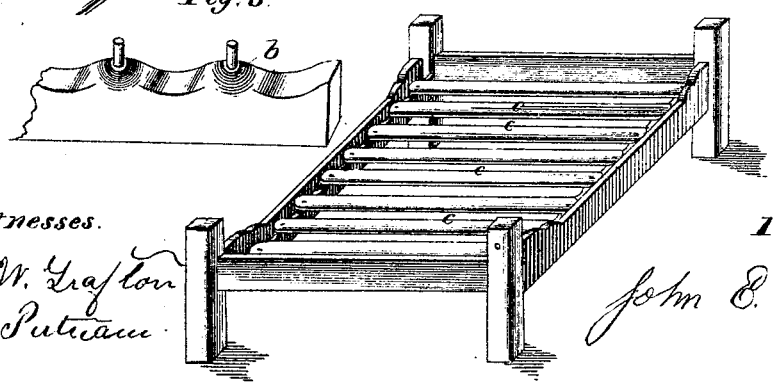
Witnesses.
John W. Trafton
G. W. S. Putnam
Inventor.
John E. Staples

UNITED STATES PATENT OFFICE.

JOHN E. STAPLES, OF YORK, MAINE.

IMPROVEMENT IN BED-BOTTOMS.

Specification forming part of Letters Patent No. 183,078, dated October 10, 1876; application filed July 22, 1876.

*To all whom it may concern:*

Be it known that I, JOHN E. STAPLES, of York, in the county of York and State of Maine, have invented a new and useful Improvement in Spring Bed-Bottoms; and I do hereby declare that the following is a full, clear, and exact description of the same, reference being had to the accompanying drawings, forming part of this specification, in which—

Figure 1 is a view, in perspective, of a bedstead having my improvement. Fig. 2 is a similar view of one of the supporting-rails, having the curved bearings and retaining device. Fig. 3 is a similar view of one of the slats, having the double-reamed holes or slots. Fig. 4 is a view of slats and their supporting-rails on a larger scale than as shown in Fig. 1. Fig. 5 is a view of a part of a slat severed at the slot, and showing the double reaming. Fig. 6 is a view of my improvement applied transversely to the bedstead, and Figs. 7 and 8 are detail views of portions of the supporting-rails, showing the curved bearings more fully.

The object of my invention is to construct a bed-bottom of spring-slats, that can yield to the weight not only vertically, but also with a rolling movement, and that can be reversed whenever, from long-continued use, they begin to sag, all being constructed in such a manner as to be strong and durable, and so inexpensive as to be within the means of all; and it consists in so forming the end supporting-rails that they shall present curved bearings for the ends of the slats, the said bearings being provided with holding devices to retain the end of the slats always in position upon them, and yet allow the slat a yielding movement in any direction.

In the accompanying drawing, I have shown in Fig. 1 a bedstead provided with my improvement. *a a* represent the end rails of a bedstead, the upper edges of which are undulating in form, and the curvatures are not only lengthwise of the rails, but also transverse to it, so that the effect is to make the summits *b b* of the wavy edge, in form, segments of a sphere. It will be obvious that any flat piece like the end of an ordinary spring-slat, being laid upon the summit or crown *b*, and loosely held by a suitable retaining device, will be able to yield in any direction to the weight brought upon it. *c c* represent slats made of tough and elastic wood, which rest upon the bearings *b*. From the form of said bearings, the said slats are able to yield not only vertically, but also laterally, and so accommodate themselves to the form which the superincumbent body may give to the mattress. I may apply the slats longitudinally, as shown in Fig. 1, or transversely, as shown in Fig. 6. I may form the curved bearings directly upon the rails of the bedstead, or upon separate pieces, as shown in Fig. 2, attached to the rails. To retain the ends of the slats upon the bearings *b*, I may employ a variety of devices; but that which I prefer is a pin, *d*, made of wood or metal, secured in the top of the bearings and calculated to hold the slat by entering a hole or slot, *e*, in each end thereof. The said holes or slots are made large enough to allow a little play of the slat upon the pin, and they are reamed out on both sides, as shown in Fig. 5, so as to allow to the slat the utmost amount of rolling play without lateral displacement. I employ an elongated slot in one or both ends, to allow for longitudinal movement of the slats as they are sprung downward.

To prevent creaking, I employ a washer of cloth or leather between the slat, the pin, and the bearing.

This bed-bottom can be applied not only by the above modes of attachment, but by being placed in light frame-work, the whole to rest upon common cross-slats, upon bed-cord, or other suitable support.

The slats, being the same upon both sides, may be turned over when, from long-continued use, they begin to sag, and they are then as good as new.

I am aware that spring bed-bottoms have been constructed of longitudinal spring-slats, and calculated to yield laterally or with rolling movement, but in them slats have been suspended by elastic bands, or by staples and links of wire—modes of construction less simple and durable and cheap, and not so easily admitting of the turning of the slats.

Having thus described my invention, what I claim as new, and desire to secure by Letters Patent, is—

1. The combination, with the slats of the curved bearings $b$, and suitable-retaining mechanism, substantially as and for the purpose set forth.

2. The slats $c$, having the holes or slots $e$ in their ends reamed on both sides, in combination with the curved bearings $b$, having the pins $d$, substantially as and for the purpose described.

JOHN E. STAPLES.

Witnesses:
 JOHN W. TRAFTON,
 G. W. V. PUTNAM.